F. H. TREGO.
HYDRAULIC BRAKE MECHANISM.
APPLICATION FILED MAR. 18, 1915.
1,147,579.
Patented July 20, 1915.
2 SHEETS—SHEET 1.
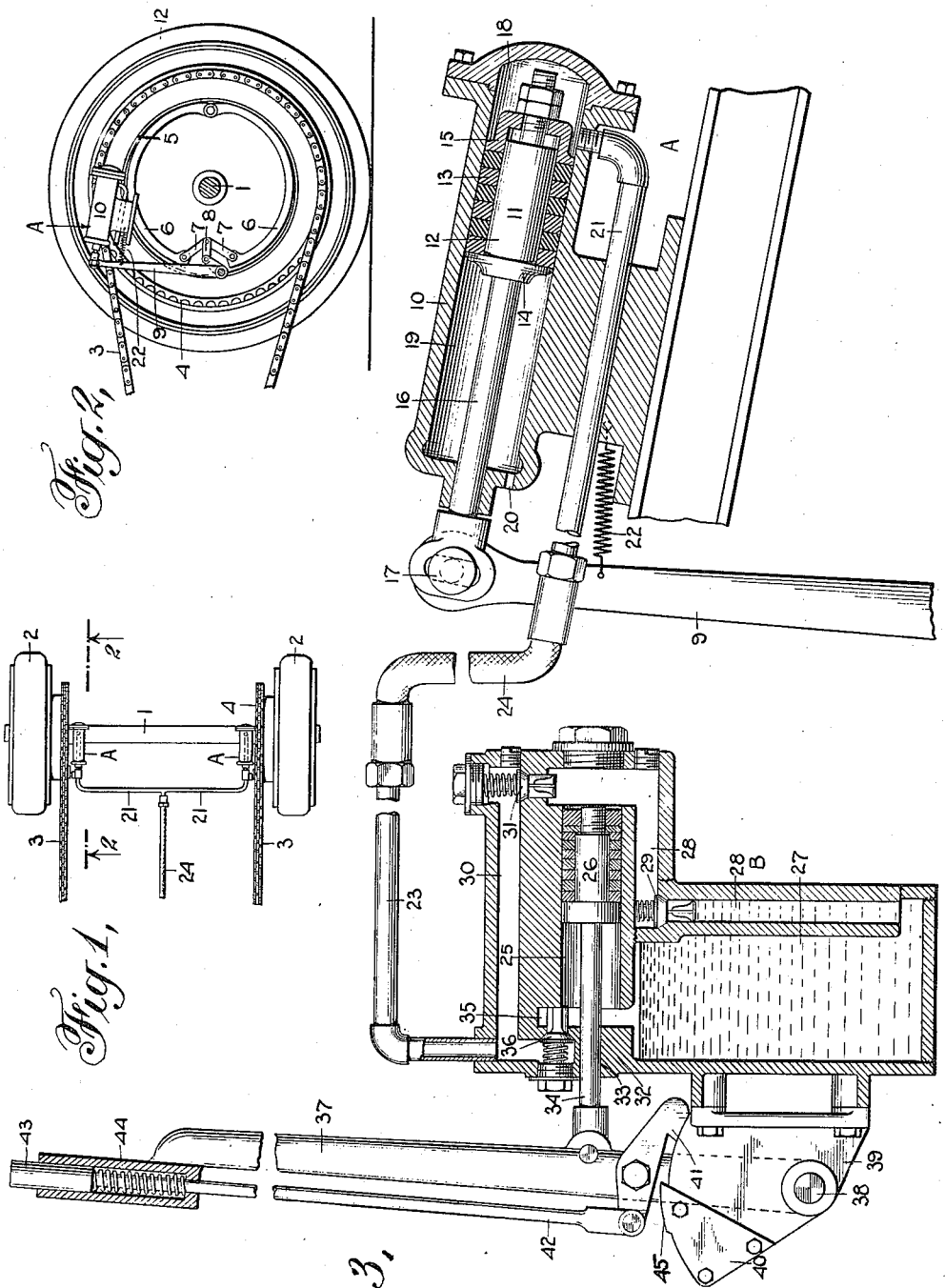
WITNESSES
INVENTOR
Frank Harris Trego
BY
ATTORNEYS

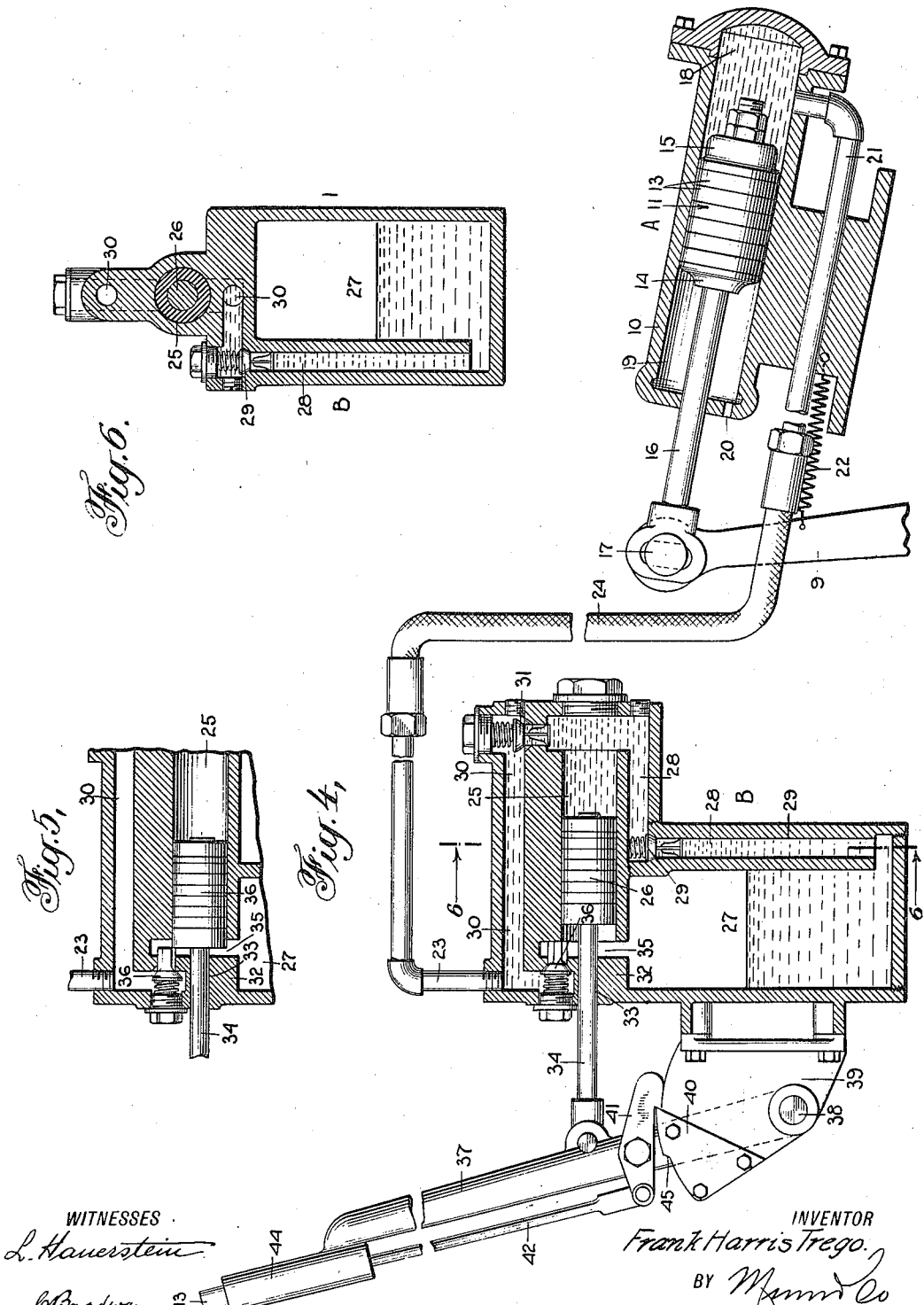

UNITED STATES PATENT OFFICE.

FRANK H. TREGO, OF SPRINGFIELD, MASSACHUSETTS, ASSIGNOR TO KNOX MOTORS COMPANY, OF SPRINGFIELD, MASSACHUSETTS.

HYDRAULIC BRAKE MECHANISM.

1,147,579. Specification of Letters Patent. Patented July 20, 1915.

Application filed March 18, 1915. Serial No. 15,244.

*To all whom it may concern:*

Be it known that I, FRANK HARRIS TREGO, a citizen of the United States, and a resident of Springfield, in the county of Hampden and State of Massachusetts, have invented a new and Improved Hydraulic Brake Mechanism, of which the following is a full, clear, and exact description.

This invention relates to a brake mechanism of the hydraulic type, and is especially adapted for use in connection with trucks of large tonnage on which hand-operated brakes are unsatisfactory, in that they cannot be applied without undue effort on the part of the driver, but it is to be understood that the invention is not necessarily limited in its application to trucks.

The invention has for its general objects to improve and simplify the construction and operation of brake mechanism so as to be reliable and efficient in use, comparatively simple to manufacture, install and keep in repair, and so designed that the brakes can be set by the driver with comparative ease and released by the mere opening of a valve which allows the hydraulic medium to flow out of the brake motors to the storage reservoir.

As a more specific object the invention provides a novel pump for establishing the hydraulic pressure in the brake motors, the movable element of the pump being operated by a lever conveniently accessible to the driver, but when the brakes are to be released the operating lever can, by the releasing of a catch or stop, have a longer range of movement in one direction, whereby the piston of the pump can be caused to unseat a by-pass valve for the purpose of permitting the fluid to return from the brake motors to the reservoir, as the pistons will be moved by the springs which cause the brakes to open or release, and this movement of the motor pistons will force fluid back to the reservoir of the pump.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a plan view of the driving wheels of a truck showing the hydraulic brake mechanism; Fig. 2 is an enlarged sectional view on the line 2—2, Fig. 1; Fig. 3 is a view showing in section one of the brake cylinders and the pump for establishing therein the hydraulic brake setting pressure; Fig. 4 is a similar view showing the position of the parts when the brake is set; Fig. 5 is a detail view showing the by-pass or relief valve; Fig. 6 is a sectional view on the line 6—6, Fig. 4.

Referring to the drawing, 1 designates the rear axle of a truck and on which are the driving wheels 2 driven in any suitable manner, as for instance, by sprocket chains 3 that mesh with teeth 4 carried by the wheels 2. Each wheel is provided with a suitable brake that is to be operated by hydraulic pressure, the brake in the present instance being of the internal type and consisting of a drum 5 with which coöperate outwardly setting brake elements 6 that have their free ends connected with toggle links 7 that are in turn connected by a link 8 with a bell-crank lever 9. The levers 9 of the brakes are operated by motors A rigidly mounted on the frame of the vehicle. Each motor, as shown in Figs. 3 and 4, comprises a cylinder 10 in which reciprocates a piston 11 made up of a cylindrical body 12 having packing rings 13 clamped between heads 14 and 15. This piston is connected with a rod 16 that extends out of the cylinder 10 and is connected by a slot and pin connection 17 with the upper end of the brake lever 9. The piston 11 divides the cylinder 10 into two chambers 18 and 19, the latter being open to the air through a vent 20, and the former chamber 19 is adapted to be connected by a pipe 21 with a source of fluid under pressure. When pressure is established in the chamber 18 it moves the piston 11 to the left and effects the setting of the brake elements 6, and when the pressure of the fluid is released, the piston 11 will move to the right by reason of a suitably arranged spring 22 that effects or assists in effecting the release of the brake shoes 6.

The device for establishing the fluid pressure in the motors comprises a combined pump and reservoir B which has a pipe 23 that is connected by a flexible tube 24 with the pipes 21 of the brake motors A, whereby oil or other liquid may flow to and from the latter. The device B comprises a pump cylinder 25 in which reciprocates a piston 26 for forcing the fluid from the reservoir or storage chamber 27 to the motors. The cylinder 25 communicates through a passage 28 with the bottom of the reservoir 27, and a check valve 29 opens toward the cylinder to allow fluid to pass to the latter during the suction stroke or movement of the piston 26 to the left, Figs. 3 and 4. The wall of the cylinder 27 has a passage 30 that communicates with the outlet pipe 23, and between the passage 30 and the cylinder is a check valve 31 that opens outwardly so that when the piston 26 moves to the right, fluid will be expelled from the cylinder 25, thence through the passage 30, pipes 23, 24 and 21, to the motor cylinders. The head 32 of the pump cylinder has an opening 33 through which the piston rod 34 extends, and a port 35 connects the cylinder 25 with the top of the reservoir 27. This port 35 is adapted to communicate with the passage 30 to form a by-pass which is normally closed by a check valve 36. When the piston 26 has moved to its extreme limit toward the left the piston engages the check valve 36 and opens the same, whereby the hydraulic pressure in the motors is diminished so that the brake springs will operate to force the fluid out of the motors and back into the reservoir, the fluid passing from the passage 30 past the open check valve 36 and through the port 35 to the reservoir 27. As the left end of the piston 26 is not used for pumping liquid, there is no necessity for a stuffing box around the piston rod 34.

The means for operating the pump comprises in the present instance a lever 37 which is fulcrumed at 38 on a bracket 39 fastened to the wall of the reservoir 27, and by oscillating this lever, which is located at a point conveniently accessible to the driver, the brakes can be set or released. To prevent the releasing of the brakes accidentally by moving the piston 26 too far, a controllable stop means is provided. This stop means consists of a stop 40 on the bracket 39 and a pivoted stop catch 41 on the lever 37, which catch is connected with an operating rod 42 or other suitable means that terminates in a spring-pressed push-button 43 in the top of the handle 44 on the lever 37. While the brakes are being set the handle 44 is gripped by the driver and the lever reciprocated to force liquid to the motors A, and during this action there is no danger of the by-pass check valve 36 being accidentally opened, since the forward movement of the lever 37 is limited by the catch 41 engaging the stop 40. When the brakes are to be released the operator pushes downwardly on the push-button 43, whereby the catch 41 is raised above the stop 40, and now the lever can be moved forwardly far enough to cause the piston 26 to unseat the valve 36. The fluid which has been maintained under pressure by the seated discharge valve 31 is now permitted to flow back to the reservoir through the open by-pass. After the brakes are released the operator brings the lever 37 backwardly to normal position, and in so doing the catch 41 passes over the cam surface 45 of the stop 40 until the latter is cleared, as shown in Fig. 1.

By properly proportioning the parts any desired pressure may be produced on the motors by the operation of the driver's brake lever 37, and consequently the heaviest types of vehicles can be readily braked manually.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as are within the scope of the appended claims.

Having thus described my invention, I claim as new and desire to secure by Letters Patent:

1. In a hydraulic system of the class described, the combination of a pump including a cylinder and piston, a discharge conduit connected with the cylinder, a valve between the conduit and cylinder, a reservoir, a valve-controlled suction conduit between the reservoir and cylinder, a by-pass between the first-mentioned conduit and reservoir, a normally closed valve in the by-pass and arranged to be engaged by the piston, an operating element for the piston, a stop catch carried by the operating element, a stop disposed to engage the catch for preventing the piston normally from moving into engagement with the by-pass valve, and means carried by the element for releasing the stop catch to permit the operating element through the piston to open the by-pass valve.

2. In a hydraulic system of the class described, the combination of a pump including a cylinder and piston, a discharge conduit connected with the cylinder, a valve between the conduit and cylinder, a reservoir, a valve-controlled suction conduit between the reservoir and cylinder, a by-pass between the first-mentioned conduit and reservoir, a normally closed valve in the by-pass and arranged to be engaged by the piston, an operating element for the piston, a stop catch carried by the operating element, a stop disposed to engage the catch for preventing the piston normally from moving into engagement with the by-pass valve, and a spring-pressed member carried by the element and connected with the catch to move the latter from engaging relation with the stop, whereby the operating element can be moved beyond its normal range to open the by-pass valve by the piston.

3. The combination of a casing including a reservoir for liquid, a cylinder in the casing, a passage connecting one end of the cylinder with the reservoir, a suction valve in the passage, an outlet passage connected with the cylinder, an outlet valve in the latter passage, a by-pass passage between the outlet passage and top of the reservoir and forming an open communication between the top of the reservoir and the end of the cylinder opposite from that receiving liquid from the reservoir, a valve in the by-pass, a piston in the cylinder and adapted to operate the by-pass valve, and a rod connected with the piston and extending across the by-pass passage and through the wall thereof, whereby a packing for the rod is dispensed with.

4. The combination of a pump cylinder having inlet and outlet passages connected with one end, a piston in the cylinder, a valve in the passages, a reservoir having an air space at its top and holding liquid to supply the inlet passage, a by-pass passage communicating with the cylinder at the end opposite from that having the inlet and outlet passages and also communicating with the outlet passage and reservoir, a valve controlling the by-pass passage, and a rod connected with the piston and extending across the by-pass passage and through the wall thereof, whereby a packing for the rod is dispensed with.

In testimony whereof I have signed my name to this specification in the presence of two subscribing witnesses.

FRANK H. TREGO.

Witnesses:
   FRANCIS J. LOVETT,
   A. E. KENNEDY.